(12) United States Patent
Schumacher et al.

(10) Patent No.: US 7,757,470 B2
(45) Date of Patent: Jul. 20, 2010

(54) TINE CARRIER ARRANGEMENT

(75) Inventors: Gustav Schumacher, Eichelhardt (DE); Friedrich-Wilhelm Schumacher, Eichelhardt (DE)

(73) Assignee: Erfindergemeinschaft, Gustav und Fred Schumacher GbR (DE)

( * ) Notice: Subject to any disclaimer, the term of this patent is extended or adjusted under 35 U.S.C. 154(b) by 0 days.

(21) Appl. No.: 12/266,611

(22) Filed: Nov. 7, 2008

(65) Prior Publication Data

US 2009/0120049 A1 May 14, 2009

(30) Foreign Application Priority Data

Nov. 8, 2007 (DE) .................. 10 2007 053 628

(51) Int. Cl.
*A01D 57/00* (2006.01)
(52) U.S. Cl. .................................. 56/220
(58) Field of Classification Search .......... 56/220, 56/400, 14.4, 364
See application file for complete search history.

(56) References Cited

U.S. PATENT DOCUMENTS

| 3,869,847 | A | | 3/1975 | May |
|---|---|---|---|---|
| 4,008,558 | A | | 2/1977 | Mott |
| 4,098,061 | A | | 7/1978 | Spiker |
| 4,255,921 | A | | 3/1981 | Kirby |
| 5,007,235 | A | * | 4/1991 | Nickel et al. .................. 56/12.4 |
| 5,359,839 | A | | 11/1994 | Parsons et al. |
| 6,170,244 | B1 | | 1/2001 | Coers et al. |
| 6,199,358 | B1 | | 3/2001 | Majkrzak |
| 6,698,175 | B1 | * | 3/2004 | Schumacher et al. .......... 56/220 |
| 6,907,720 | B2 | * | 6/2005 | Schumacher et al. .......... 56/400 |
| 7,124,565 | B2 | * | 10/2006 | Lanzinger ..................... 56/220 |
| 7,165,385 | B2 | * | 1/2007 | Lanzinger et al. ............. 56/220 |

FOREIGN PATENT DOCUMENTS

| DE | 26 29 353 A1 | | 1/1977 |
|---|---|---|---|
| GB | 2046066 A | * | 11/1980 |
| WO | WO 96/26636 | | 9/1996 |

* cited by examiner

*Primary Examiner*—Árpád Fábián-Kovács
(74) *Attorney, Agent, or Firm*—Harness, Dickey & Pierce, P.L.C.

(57) ABSTRACT

A tine carrier arrangement for a reel of a harvester for cereals has a tine carrier (1) rotatably attached on the reel around a rotational axis D. An adjustment element (3) is connectable to an adjustment arrangement of the reel for rotating the tine carrier (1) around the rotational axis D. The connection mechanism detachably connects the tine carrier (1) and the adjustment element (3) to each other to enable different rotational positions of the tine carrier relative to the rotational axis D.

8 Claims, 5 Drawing Sheets

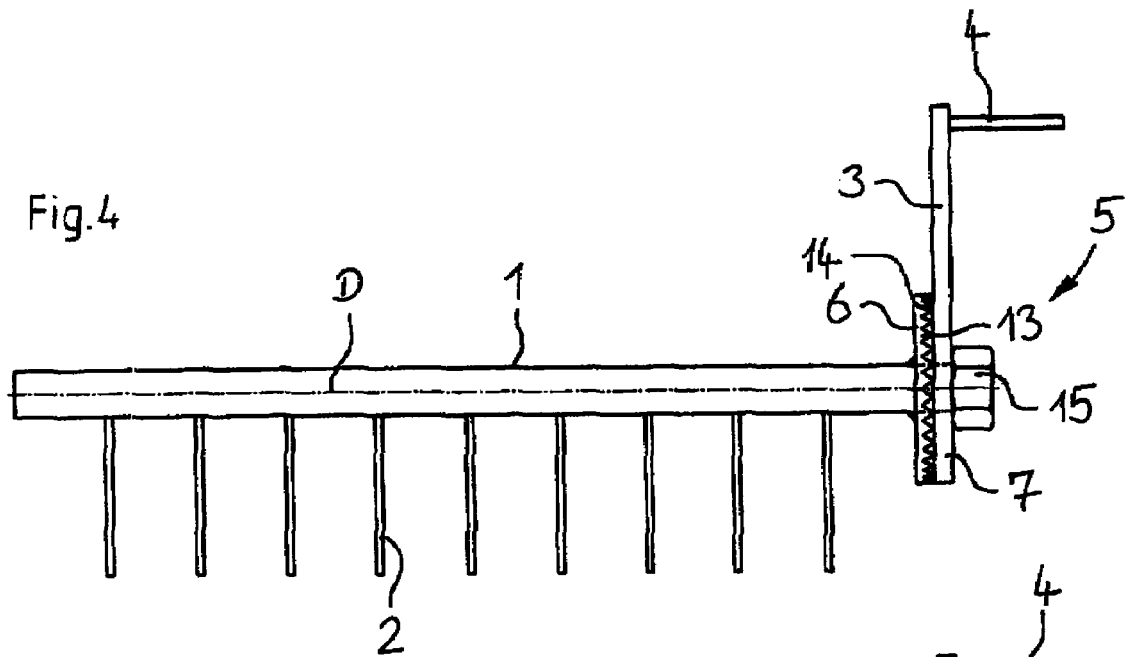
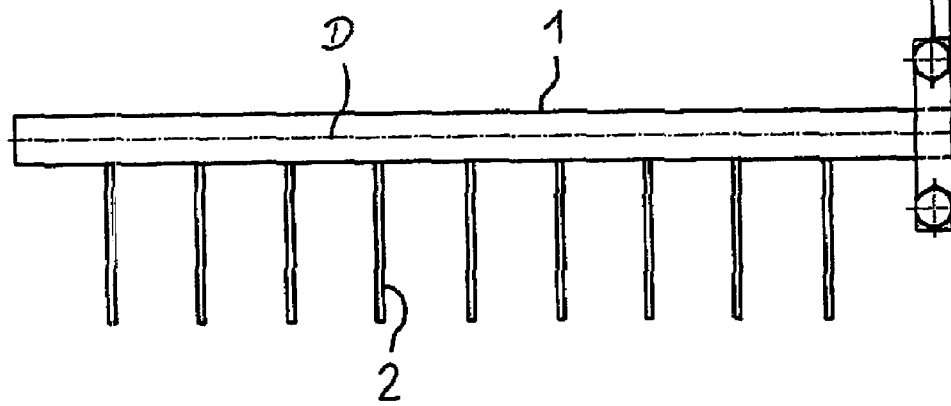
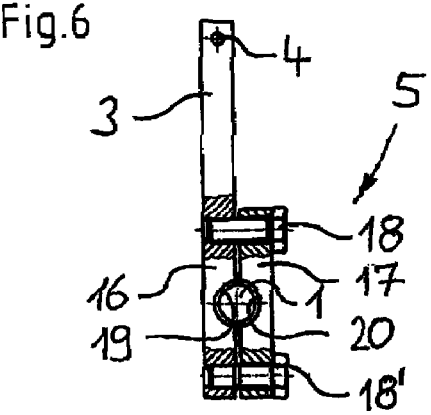

TINE CARRIER ARRANGEMENT

CROSS-REFERENCE TO RELATED APPLICATION

This application claims priority to German Patent Application No. 102007053628.5 filed Nov. 8, 2007, which application is herein expressly incorporated by reference.

FIELD

The disclosure relates to a tine carrier arrangement for a reel as well as a reel for a harvester for cereals, especially a combine harvesters.

BACKGROUND

Basically there are two distinguishing types of reels. First, a simple paddle reel that only guides the harvesting good with tine-less paddle bars for the cutting section of the harvester. Second, a tine reel exists that has paddle tubes or bars with projecting steel or plastic tines.

Tine reels have won recognition in combine harvesters compared to simple paddle reels. Only the tine reels are able to guide laid grain or entangled harvesting goods securely to the cutting section. The tines are controlled such that they engage at the same angle. The tines maintain a nearly vertically downwards direction into the harvesting good in front of the machine. A controller adjusts the tine carriers, generally in form of tubes, by crank arms, that rotate the tine carrier along a corresponding curved path. The curved paths may be formed differently. The controller may always rotate the tine carrier in the same direction or may rotate, depending on the lay-out of the curved path, a one revolution magnitude back and forth. One crank arm is always rigidly connected to the tine carrier tube. Thus, the angle to the tine can be maintained and each of the several tine carriers of a reel takes up the same engagement angle relative to the harvesting good.

If the engagement angle of the tine of all tine carriers should be changed, the control curve must be adjusted.

Such tine carrier controls are known from DE 26 29 353 A1, U.S. Pat. No. 4,098,061 and U.S. Pat. No. 6,170,244 B1.

Most reels for combine harvesters have six tine carriers. It may be desirable to alternatively provide different angle positions of the tines relative to the harvesting good. This has the advantage, that with a corresponding reel rotational speed, the harvesting good can be guided to the cutting section by differently adjusted tines. Thus, it is an advantage, when a reel portion takes up the harvesting good in front of the knife line of the cutting section, for the following reel portion to push the material into the feed screw.

In other applications, for example in the harvest of sunflowers, no tines, but only the carrier tubes or tine carriers engage the harvesting good. Thus, in such an application, not all tines of the respective tine carriers have to be detached. Accordingly, it is advantageous to be able to rotate the tine carrier by 180° so that the tines, instead of pointing downwards, are directed upwardly not engaging the falling off sensitive harvesting good. Thus, they are not arranged in an engaging position.

SUMMARY

The object of the present disclosure provides a tine carrier arrangement and a reel where the tine carriers can be adjusted in a simple manner relative to the adjustment arrangement. Thus, separate adjustment of each individual tine carrier is possible.

A tine carrier arrangement for a reel of a harvester for cereals comprises a tine carrier attachably rotatable around a rotational axis on the reel. An adjustment element is connectable to an adjustment arrangement of the reel to rotate the tine carrier around the rotational axis. A connection detachably connects the tine carrier and the adjustment element to each other in different rotational positions relative to the rotational axis.

Thus, it is possible to rotate each individual tine carrier relative to the adjustment arrangement or relative to the reel. Accordingly, the adjustment element is detached from the tine carrier. The tine carrier can be rotated on the reel until the required angular position is achieved. The adjustment element can again be non-rotationally connected to the tine carrier. Thus, no cumbersome constructional adaptation of the tine carrier is necessary, which, furthermore, would enable no later adjustment. Also, neither the adjustment element itself nor the adjustment arrangement has to be changed. Additionally, each tine carrier can be separately individually adjusted.

In this case, the tine carrier and the adjustment element can be form-fittingly or force-fittingly connected to each other.

The connection comprises a connection flange on the tine carrier and a connection portion on the adjustment element. The flange and portion are connected to each other. In this case, the tine carrier can be screwed onto the adjustment element.

First attachment bores are distributed around the rotational axis and are arranged in the connection flange. The adjustment element has a specific number of second attachment bores. Depending on the rotational position of the tine carrier and of the adjustment element to each other, the bore are in alignment with a corresponding number of first attachment bores. Attachment screws are passed through the first and second attachment bores that are arranged in alignment with each other to connect the tine carrier to the adjustment element. Thus, the adjustment element may be rotated and attached step-wise relative to the tine carrier.

In an embodiment that includes two second bores, they are in alignment. The two first bores are arranged diametrically to each other.

Alternatively, a pure screwed connection can be provided. The connection flange has a front teeth with locking teeth projecting in the direction of the rotational axis. In this case, the connection portion of the adjustment element has corresponding locking teeth that mesh with the front teeth of the connection flange. Thus, a non-rotational connection is achieved. Preferably, the front teeth are provided in form of a Hirth-serration.

A screwed connection can be provided for axial fixation. The screwed connection is detached for rotation. The adjustment element is displaced slightly axially along the rotational axis until the front teeth of the connection flange and the connection portion come out of engagement with each other. Thus, the adjustment element may be rotated relative to the connection flange. For the non-rotational connection, the front teeth are again brought into engagement and are secured with the connection portion teeth by a screwed connection.

Retainment against the disengagement of the teeth from each other is also possible by other means, for example, by clamping connections or other known securing means.

As a further alternative, a clamping connection between the adjustment element and the tine carrier is also possible. In this case, the connection portion has two clamping elements that are clamped onto the tine carrier. In this case, the two clamping elements may form a bore. The tine carrier, in the form of a tube, is passed through the bore. The two clamping elements are clamped onto the outer circumferential face of the tine carrier.

Furthermore, a reel may have a plurality of reel stars that are rotationally arranged around an axis of rotation. Several tine carrier arrangements, as explained above, are rotatably attached to at least two reel stars around a rotational axis parallel to the axis of rotation. Further, an adjustment arrangement is provided. The reel stars are rotatably relative to the adjustment arrangement. Additionally, the adjustment elements of each tine carrier are connected in a driving manner.

Preferably, the adjustment arrangement is provided in the form of a control curve. Guide elements of the adjustment element are guided along the control curve.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a plan view of a tine carrier arrangement with a connection in the form of front teeth.

FIG. 5 is a plan view of a tine carrier arrangement with a connection in the form of a clamping connection.

FIG. 6 is a side partially in cross-section view of the clamping connection according to FIG. 5.

DETAILED DESCRIPTION

The following description is merely exemplary in nature and is not intended to limit the present disclosure, application, or uses.

Figure 1:
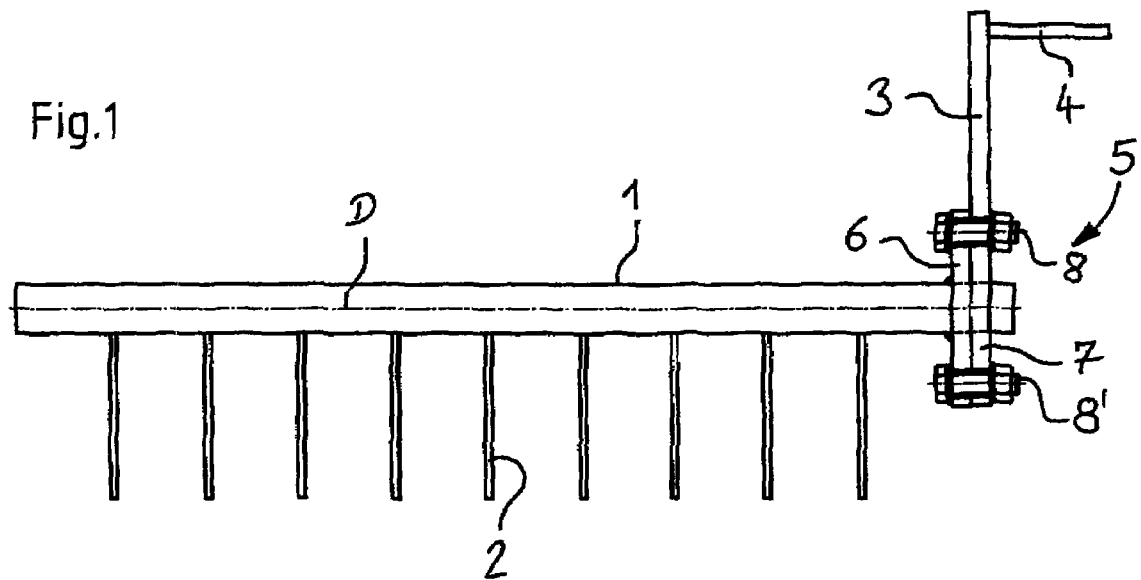
FIG. 1 is a plan view of a tine carrier arrangement with a connection in the form of screwed connections.

FIG. 1 shows a plan view of a tine carrier arrangement according to the disclosure. The tine carrier arrangement includes a tine carrier 1, in the form of a tube. The tine carrier 1 is attached parallel to an axis of rotation of a reel (not shown here) rotationally around a rotational axis D on the reel. The reel has reel stars that are rotatable around the axis of rotation. Several tine carriers 1 are rotatably supported on the reel stars. The tine carriers 1 are, generally, supported at their ends on the reel stars.

Several pick-up tines 2 project radially from the rotational axis D and are attached to the tine carrier 1. A lever 3 rotates the tine carrier 1 relative to the reel. The lever 3 interacts with a control arrangement of the reel (not shown here). The lever 3 is non-rotatably and detachably connected to the tine carrier 1. The lever has a control element 4 in form of a rod. The control element 4 is guided on a control curve of the control arrangement, parallel to the rotational axis D. The control element 4 can directly abut the control curve or may be supported on the same by a roller. The control element 4 and the tine carrier 1 are rotated relative to the reel by means of a variable distance of the control curve relative to the rotation axis D.

The lever 3 is detachably connected, via a connection mechanism 5, to the tine carrier 1. The connection mechanism 5 includes a connection flange 6, in the form of a circular disc. The connection flange 6 is pushed onto the tubular tine carrier 1 and is welded to it. The connection mechanism 5 includes a connection portion 7 of the lever 3. The lever 3, via the connection portion 7, is detachably mounted on the connection flange 6, via attachment screws 8.

Figure 2:
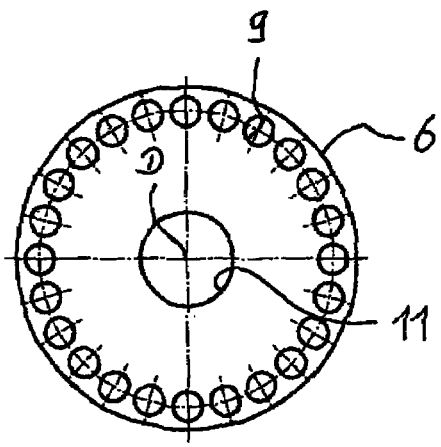
FIG. 2 is a top plan view of a connection flange with attachment bores.
Figure 3:
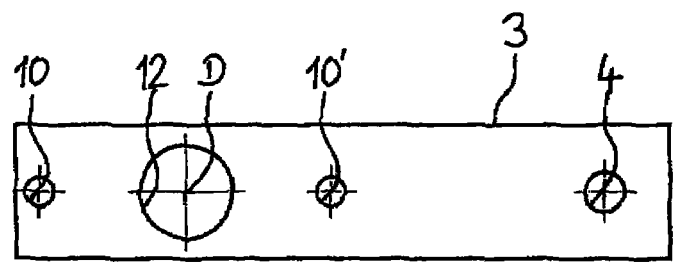
FIG. 3 is a plan view of an adjustment element with attachment bores.

FIG. 2 shows a top view of the connection flange 6 according to FIG. 1. FIG. 3 shows a top view of the lever 3, according to FIG. 1. FIGS. 2 and 3 are described together in the following.

The connection flange 6 has a central bore 11 that enables it to be pushed onto the tubular tine carrier 1. A multiplicity of first attachment bores 9 are arranged in the connection flange 6 and are distributed around the rotational axis D. The axes of the first connection bores 9 are arranged parallel to the rotational axis D. The lever 3 has a bore 12 that enables the lever 3 to be pushed onto the tubular tine carrier 1. The two second attachment bores 10, 10' are arranged relative to the rotational axis D diametrically to each other. The two second bores 10, 10' are arranged parallel to the rotational axis D. During the assembly of the lever 3, the two second attachment bores 10, 10' can be arranged in a fully overlapping manner in alignment with two of the first attachment bores 9. The attachment screws 8, 8' secure the lever 3 with the connection flange 6. In the present example, the attachment screws 8, 8' pass through the first and second attachment bores 9, 10, 10' that are arranged in alignment to fully overlap each other. The screws 8, 8' are tightened by a nut. Also, other possibilities of screwed connections may be considered. For example, the connection flange 6 or the lever 3 may have attachment bores in form of threaded bores.

If the tine carrier 1 has to be rotated relative to the other tine carriers of the reel or relative to the reel, the attachment screws 8, 8' have to be removed. The attachment screws 8, 8' are pulled out of the attachment bores 9, 10, 10'. The lever 3 is rotated on the tine carrier 1. The lever 3 may be moved, with the tine carrier 1 in the desired rotational position, into a position relative to the reel, where the two second attachment bores 10, 10' fully overlap the two second attachment bores 9. Thus, the lever 3 can be attached by the attachment screws 8, 8' to the connection flange 6. Each individual tine carrier 1 of a reel can be individually adjusted separately from the other tine carriers.

FIG. 4 shows a second embodiment of a tine carrier arrangement according to the disclosure. The second embodiment corresponds in many parts to the first embodiment according to FIGS. 1 to 3. Therefore, corresponding components are provided with the same reference numerals as described in FIGS. 1 to 3.

In contrast to the connection mechanism 5 according to the first embodiment, the second embodiment has a connection flange 6 with front teeth with first locking teeth 13. The first locking teeth 13 project in the direction of the rotational axis D from the connection flange 6 in the direction of the connection portion 7 of the lever 3. The connection portion 7 of the lever 3 has second locking teeth 14. The teeth 14 project in the direction to the connection flange 6. In the connected condition, the first locking teeth 13 mesh with the second locking teeth 14. Thus, this ensures a non-rotational connection between the lever 3 and the connection flange 6. A shaft nut 15 is screwed onto a threaded portion of the tubular tine carrier 1 to secure the lever 3. Thus, the connection portion 17 is fixably held against the connection flange 6. In order to detach the connection, the shaft nut 15 is loosened and the lever 3 is pushed axially away from the tine carrier 1 until the locking teeth 13, 14 are out off engagement with one another. Thus, the tine carrier 1 can be rotated relative to the lever 3. The shaft nut 15 is then again tightened for the rotatably fast connection.

Also, other form-fitting connections may be considered where projections on the connection flange or on the connection portion engage in recesses on the respective opposed component (connection portion or connection flange). Also, a screwed connection, according to the first embodiment, may be considered to secure the lever 3 relative to the connection flange 6.

FIG. 5 shows a plan view of a third embodiment of a tine carrier arrangement according to the disclosure. FIG. 6 shows a partial cross-sectional side view of FIG. 5. FIGS. 5 and 6 are described in the following, wherein components, which correspond to the components of the first embodiment, are provided with the same reference numerals and are described with reference to FIGS. 1 to 3.

In contrast to the first embodiment, the connection mechanism has a first clamping element 16 and a second clamping element 17. The clamping elements 16, 17 clamp the tine carrier 1 between them. The first clamping element 16 is integrally formed with the lever 3. The first clamping element 16 has a first recess 19 to receive the tine carrier 1. The second clamping element 17 is formed as a separate component. It has a second recess 20 that forms a through opening with the first recess 19 to receive the tine carrier 1. The second clamping element 17 is connected by attachment screws 18, 18' to the first clamping element 16. The second clamping element 17 is not directly supported on the first clamping element 16, but only on the tine carrier 1. Thus, the lever 3 is securely attached onto the tine carrier 1 by friction. Generally, it is also possible that the first recess 19 and the second recess 20 are formed with longitudinal teeth that engages in corresponding shaft teeth of the tine carrier 1 to produce a rotatably secured form-fitting connection.

Figure 7:
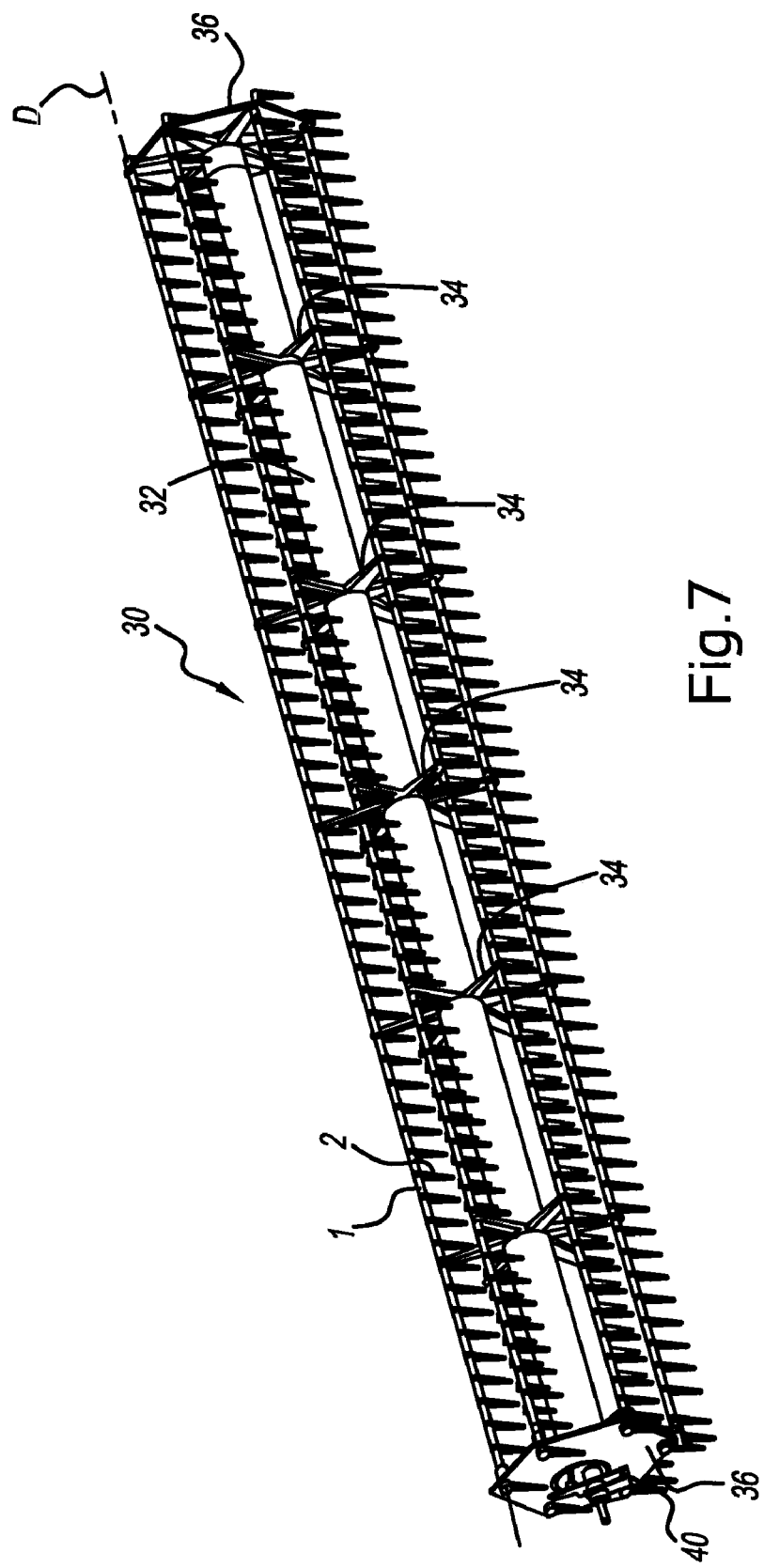
FIG. 7 is a perspective view of a reel of a harvester.
Figure 8:
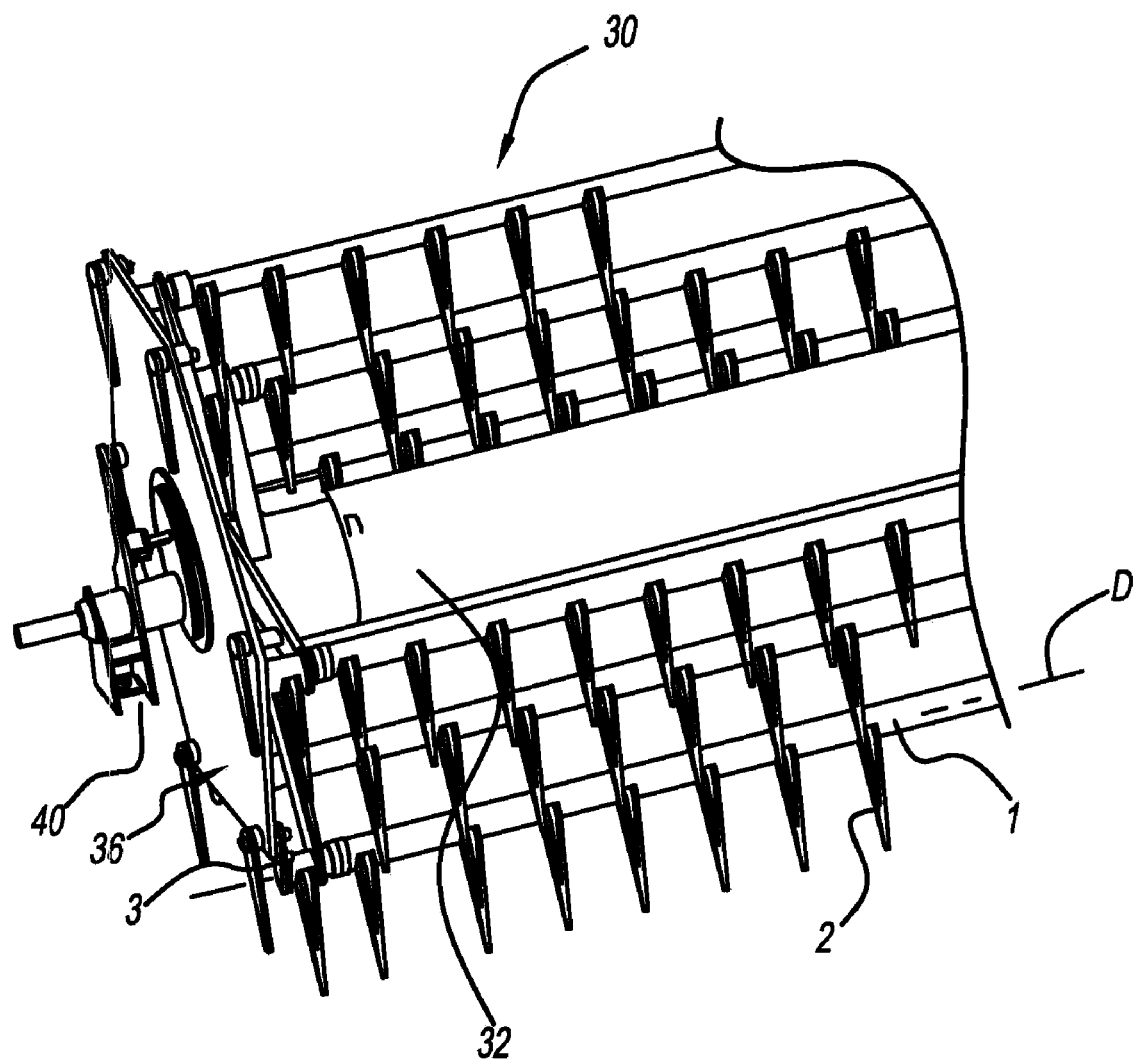
FIG. 8 is an enlarged perspective view of the end of FIG. 7.
Figure 9:
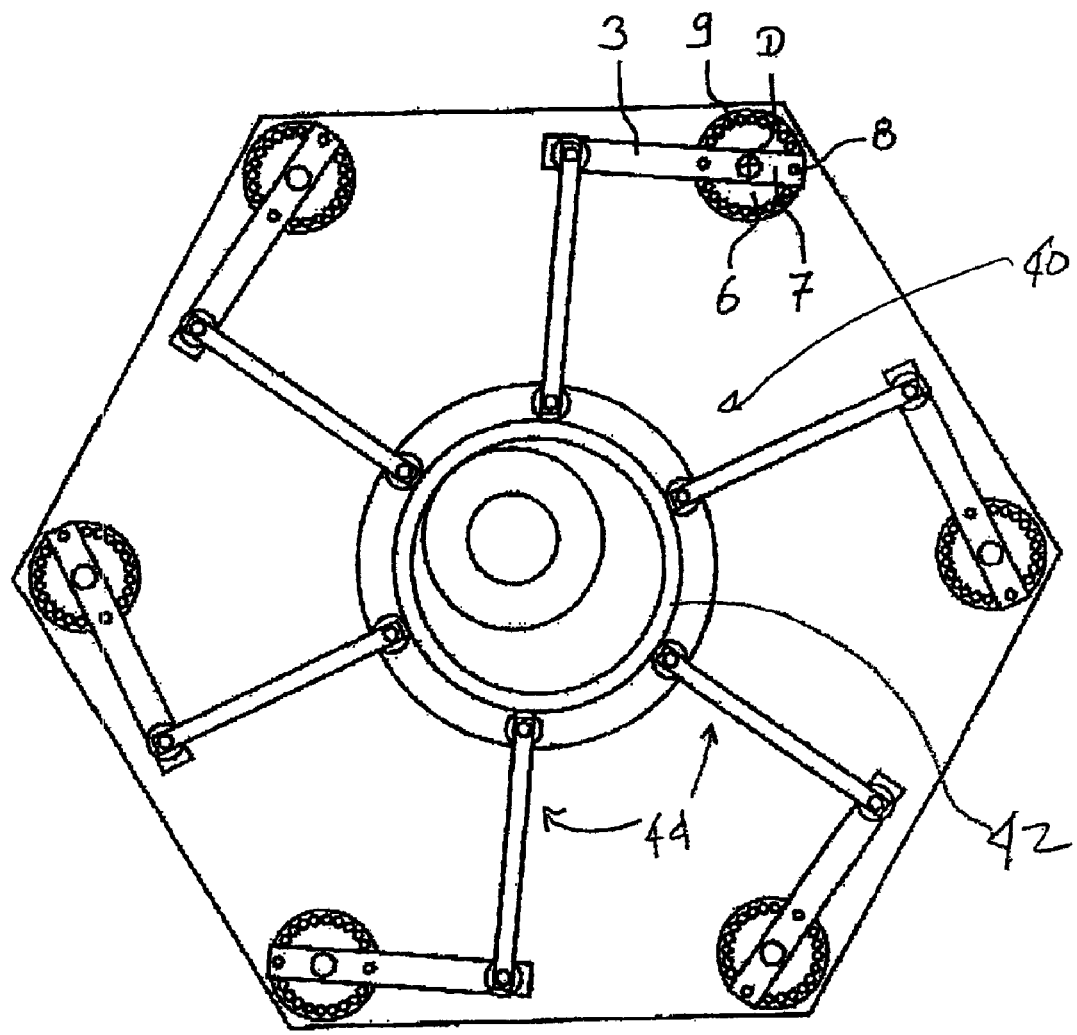
FIG. 9 is a side plan view of the reel of FIG. 7

FIGS. 7-9 illustrate a reel for a harvester. The reel 30 includes a main tube 32 which supports a plurality of tine carrier via reel stars 34. Also, the reel includes a pair of ends 36 that support the tine carriers. The reels stars and ends 34 and 36 support the tine carriers 1 as illustrated in FIG. 7. At least one of the ends 36 includes an adjustment arrangement 40. The adjustment arrangement 40 includes a control curve 42 and guide elements 44. Guide elements 44 are connected to the levers 3 to impart the motion of the curve 42 onto each tine carrier. Generally, the guides include a linkage bar and a roller that rolls on the contour 42.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A tine carrier arrangement for a reel of a harvester for cereals comprising:
a tine carrier rotatable around a rotational axis on the reel;
an adjustment element connectable to an adjustment arrangement of the reel, said adjustment element rotating the tine carrier and being locked to the tine carrier in one of a plurality of positions around the rotational axis; and
connection mechanism for detachably connecting the tine carrier and the adjustment element to each other in one of said plurality of different rotational positions of the adjustment element independent of the adjustment arrangement relative to the rotational axis, the connection mechanism further comprises a connection flange on the tine carrier and a connection portion on the adjustment element that are connected to each other, first attachment mechanisms distributed around the rotational axis and arranged with the connection flange and the adjustment element has a specific number of second attachment mechanisms that, depending on the rotational position of the tine carrier and of the adjustment element to each other, are in alignment with a corresponding number of first attachment mechanisms and the first and second attachment mechanisms, aligned with each other and coupled together, to connect the tine carrier and the adjustment element.

2. The tine carrier arrangement according to claim 1, wherein the tine carrier is secured to the adjustment element by at least one screw.

3. The tine carrier arrangement according to claim 1, wherein said first attachment mechanisms are bores and the adjustment element second attachment mechanisms are bores and attachment screws are passed through the first and second attachment mechanism bores, aligned with each other, to connect the tine carrier and the adjustment element.

4. The tine carrier arrangement according to claim 3, wherein two second attachment mechanism bores are provided and said two second attachment mechanism bores are in alignment with two first attachment mechanism bores arranged diametrically to each other.

5. The tine carrier arrangement according to claim 1, wherein the first attachment mechanism are first locking teeth projecting in a direction along the rotational axis and that second attachment mechanisms are second locking teeth corresponding and meshing with the first locking teeth.

6. The tine carrier arrangement according to claim 1, wherein the connection portion has two clamping elements that are clamped onto the tine carrier.

7. A reel comprising:
several reel stars that are rotatably arranged around an axis of rotation;
a plurality of tine carrier arrangements according to claim 1 connected rotatably to at least two reel stars around a rotational axis parallel to the axis of rotation; and
the reel stars are rotatable relative to the adjustment arrangement with the adjustment elements of each tine carrier connected with said adjustment arrangement in a driving manner.

8. The reel according to claim 7, wherein the adjustment arrangement comprises a control curve and guide elements of the adjustment elements are guided along the control curve.

* * * * *